United States Patent [19]

Maxwell et al.

[11] Patent Number: 5,419,192

[45] Date of Patent: May 30, 1995

[54] APPARATUS FOR BALANCING A COMBINED ASSEMBLY OF A DRIVE SHAFT AND AXLE INPUT SHAFT

[75] Inventors: David W. Maxwell, Delphos; James T. Reynolds, Toledo; Gary L. Smith, Southgate; Leon W. Valencic, Holland, all of Ohio

[73] Assignee: Dana Corporation, Toledo, Ohio

[21] Appl. No.: 943,283

[22] Filed: Sep. 10, 1992

[51] Int. Cl.⁶ .............................................. G01M 1/16
[52] U.S. Cl. ......................................... 73/462; 73/468
[58] Field of Search ................ 73/462, 460, 118.1, 73/457, 458, 468, 473, 475; 464/180

[56] References Cited

U.S. PATENT DOCUMENTS

| | | | |
|---|---|---|---|
| 2,691,283 | 10/1954 | Stover | 464/90 |
| 3,326,036 | 6/1967 | Hoeppner | 73/593 |
| 3,712,127 | 1/1973 | Petersen | 73/118.1 |
| 3,712,130 | 1/1973 | Weichbrodt et al. | 73/162 |
| 3,848,694 | 11/1974 | Matsui et al. | 180/381 |
| 3,887,024 | 6/1975 | Takahashi et al. | 180/381 |
| 4,170,896 | 10/1979 | Korkosz | 73/66 |
| 4,236,407 | 12/1980 | Alpini et al. | 73/118.1 |
| 4,653,324 | 3/1987 | Nugier | 73/460 |
| 4,898,026 | 2/1990 | Damitz | 73/460 |
| 4,939,985 | 7/1990 | Von Thun | 73/118.1 |
| 5,033,292 | 7/1991 | Dennis | 73/118.1 |

FOREIGN PATENT DOCUMENTS

| | | | |
|---|---|---|---|
| 866560 | 7/1949 | Germany . | |
| 3841052 | 8/1989 | Germany . | |
| 875474 | 8/1967 | United Kingdom | 73/460 |
| 1411592 | 7/1988 | U.S.S.R. | 73/460 |

*Primary Examiner*—Hezron E. Williams
*Assistant Examiner*—Christine K. Oda
*Attorney, Agent, or Firm*—MacMillan, Sobanski & Todd

[57] ABSTRACT

An apparatus for dynamically balancing a combined assembly of a drive shaft and axle input shaft for use in a vehicle drive train system. The apparatus includes a drive head adapted to be connected to one end of the drive shaft and a support head for supporting the axle. The support head includes a cradle plate extending upwardly from a base plate mounted on the apparatus. The cradle plate has an arcuate recess formed in the upper surface thereof which is adapted to receive and support a housing of the axle. A pair of support arms are also secured to the base plate, extending upwardly and outwardly therefrom. The support arms are adapted to be secured outwardly extending portions of the housing of the axle. The apparatus further includes first and second intermediate heads which are adapted to engage and support other portions of the drive train system. Sensors are provided on each of the heads for generating electrical signals which are representative of the amount of vibrations induced when the components of the drive train system are rotatably driven by the drive head. As a result, the combined assembly of the drive shaft and the axle input shaft can be dynamically balanced for use in the vehicle.

11 Claims, 4 Drawing Sheets

APPARATUS FOR BALANCING A COMBINED ASSEMBLY OF A DRIVE SHAFT AND AXLE INPUT SHAFT

BACKGROUND OF THE INVENTION

This invention relates in general to vehicular drive train balancing systems and in particular to an apparatus for dynamically balancing a combined assembly of a drive shaft and axle input shaft for such a vehicle drive train system.

Most vehicles provide a drive train system for transmitting power from a source of rotational power, such as an internal combustion or diesel engine, to a plurality of rotatably driven wheels. A typical drive train system includes a clutch, a transmission, a drive shaft, and an axle connected between the engine and the driven wheels. The clutch is connected to the engine for selectively providing a driving connection therethrough to the transmission. The transmission provides a plurality of speed change gear ratios between the clutch and the drive shaft. The drive shaft is elongated so as to transmit the rotational power from the transmission to the vicinity of the driven wheels. The axle includes an elongated input shaft which is connected to the drive shaft, a differential which is rotatably driven by the input shaft, and a pair of output axle shafts which connect the differential to the driven wheels. All of the connections between the components of the drive train are typically accomplished by universal joints or similar couplings which permit the two components to be oriented at varying angles relative to one another during use.

A typical drive shaft may be formed from an elongated cylindrical tube having a pair of universal joints secured to the ends thereof. Alternatively, a drive shaft may be formed from two (or more) elongated cylindrical tubes which are connected together by universal joints, and which further including a pair of universal joints secured to the ends thereof. As used herein, the term "drive shaft" includes the overall assembly of both the tube (or tubes) and the universal joints secured thereto. Because of manufacturing inaccuracies, both the tubes and the universal joints are typically unbalanced for rotation. Thus, when the tubes and the universal joints are assembled, the drive shaft is generally also unbalanced for rotation. Similarly, the input shafts of the axles are also typically unbalanced for rotation during use.

It is well known that undesirable noises and vibrations are generated during use if the drive shaft and the axle input shaft are not precisely balanced for rotation. Thus, it is known to balance the drive shaft and the axle input shaft individually before installation into the vehicle drive train system. Many fixtures are known in the art for individually balancing these components. However, it has been found that when an individually balanced drive shaft and an individually balanced axle input shaft are connected together in the vehicle drive train system, the combined unit may be unbalanced for rotation. This occurs even though the drive shaft and the axle input shaft may have been carefully balanced individually before installation. The unbalance of the combined unit results from the summation of the smaller individual unbalances of the drive shaft and the axle input shaft when connected together.

In the past, it has been attempted to address this combined unit unbalance by connecting together slightly unbalanced drive shafts and axle input shafts, such that the individual unbalances reduce the overall unbalance of the assembly. While this method is somewhat effective, it is difficult and time consuming. Accordingly, it would be desirable to provide an apparatus for dynamically balancing the combined assembly of a drive shaft and an axle input shaft before installation in the vehicle drive train system.

SUMMARY OF THE INVENTION

This invention relates to an apparatus for dynamically balancing a combined assembly of a drive shaft and axle input shaft for use in a vehicle drive train system. The apparatus includes a drive head adapted to be connected to one end of the drive shaft and a support head for supporting the axle. The support head includes a cradle plate extending upwardly from a base plate mounted on the apparatus. The cradle plate has an arcuate recess formed in the upper surface thereof which is adapted to receive and support a housing of the axle. A pair of support arms are also secured to the base plate, extending upwardly and outwardly therefrom. The support arms are adapted to be secured outwardly extending portions of the housing of the axle. The apparatus further includes first and second intermediate heads which are adapted to engage and support other portions of the drive train system. Sensors are provided on each of the heads for generating electrical signals which are representative of the amount of vibrations induced when the components of the drive train system are rotatably driven by the drive head. As a result, the combined assembly of the drive shaft and the axle input shaft can be dynamically balanced for use in the vehicle.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
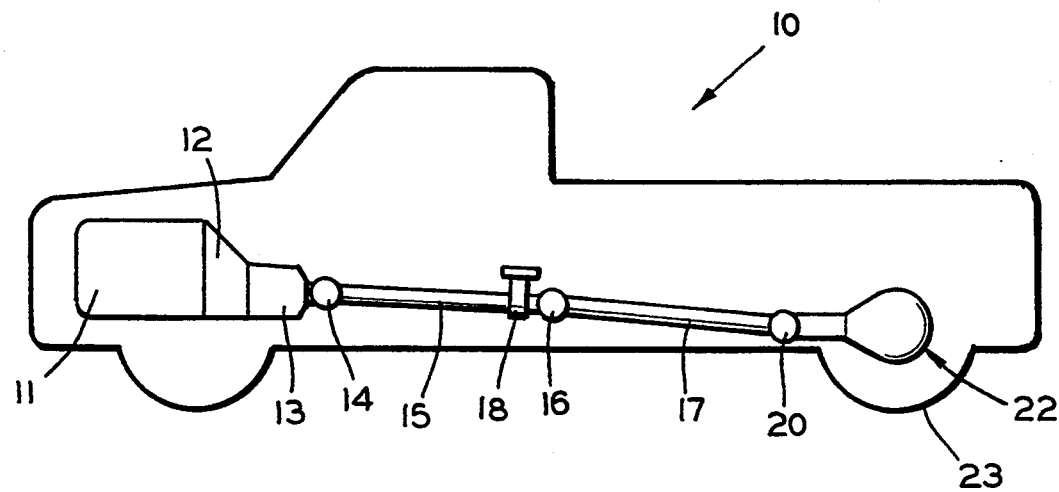
FIG. 1 is a side elevational view schematically illustrating a vehicle including a conventional drive train system.

Referring now to the drawings, there is schematically illustrated in FIG. 1 a vehicle, indicated generally at 10, including a conventional drive train system. The drive train system includes an engine 11, a clutch 12, and a transmission 13. As is well known, the engine 11 includes an output shaft (not shown) which is selectively connected through the clutch 12 to an input shaft (not shown) of the transmission 13. The transmission 13 provides a plurality of speed change gear ratios between the rotational speeds of the input shaft thereto and an output shaft (not shown).

The output shaft of the transmission 13 is connected by a first universal joint 14 to the forward end of a first drive shaft section 15. The rearward end of the first drive shaft section 15 is connected by a second universal joint 16 to the forward end of a second drive shaft section 17. A conventional center bearing assembly 18 is secured to the frame of the vehicle 10 for rotatably supporting the rearward end of the first drive shaft section 15 and, therefore, the forward end of the second drive shaft section 17.

Figure 6:
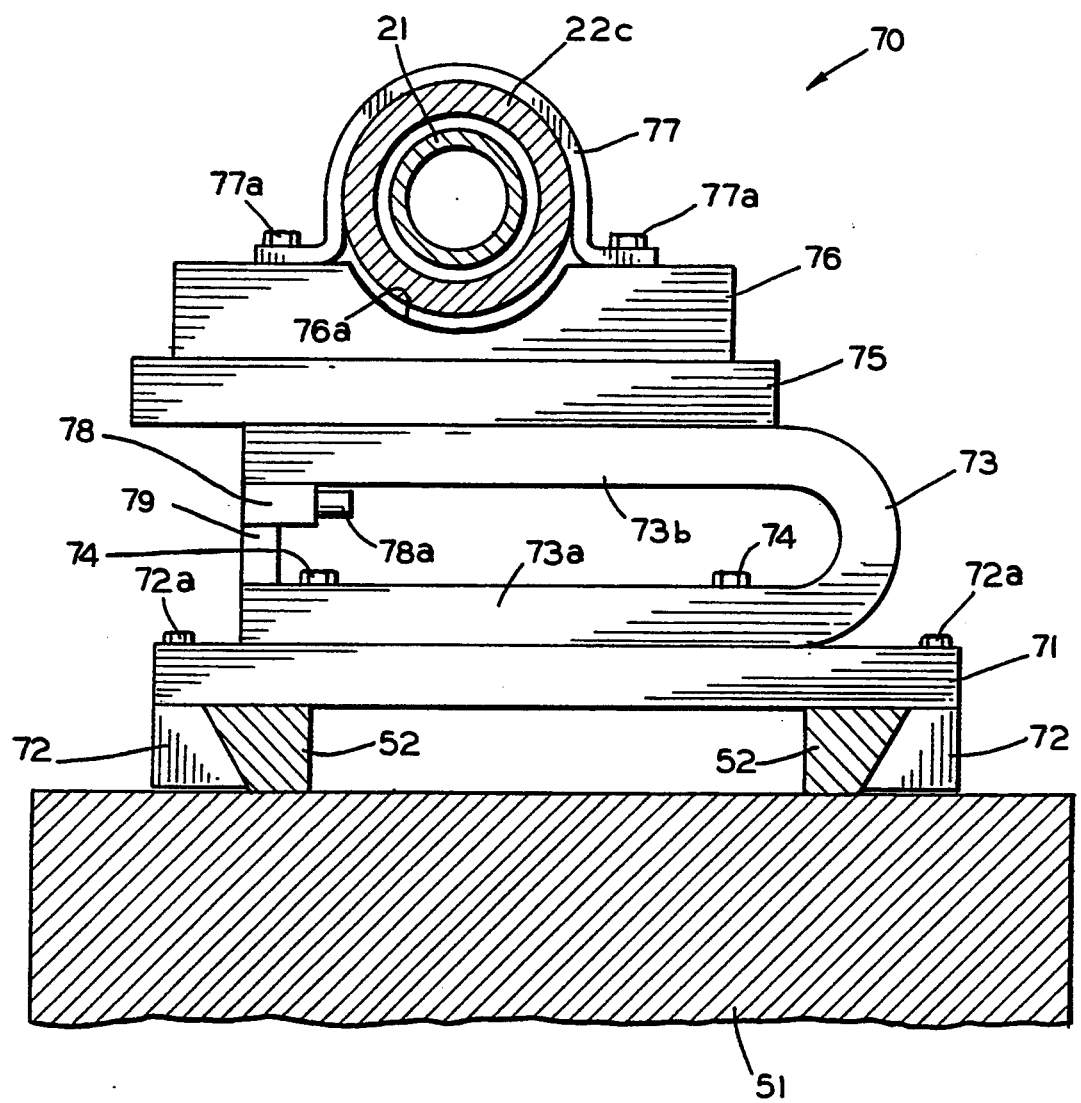
FIG. 6 is a sectional elevational view taken along line 6—6 of FIG. 4 showing the first intermediate head of the balancing apparatus.

The second drive shaft section 17 is connected by a third universal joint 20 to the forward end of a rotatable input shaft 21 (see FIG. 6) of an axle, indicated generally at 22. The axle 22 is conventional in the art and includes a differential (not shown) which is rotatably driven by the input shaft. The differential is connected to a pair of output axle shafts (not shown) which, in turn, are connected to respective driven wheels 23 (only one which is illustrated). As is well known, rotational power transmitted from the vehicle engine 11 by the drive shaft sections 15 and 17 to the differential is divided between the axle shafts to rotate the wheels 23 respectively connected thereto. As used herein, the term "drive shaft" refers to the combined assembly of the first universal joint 14, the first drive shaft section 15, the second universal joint 16, the second drive shaft section 17, and the third universal joint 20.

Figure 2:
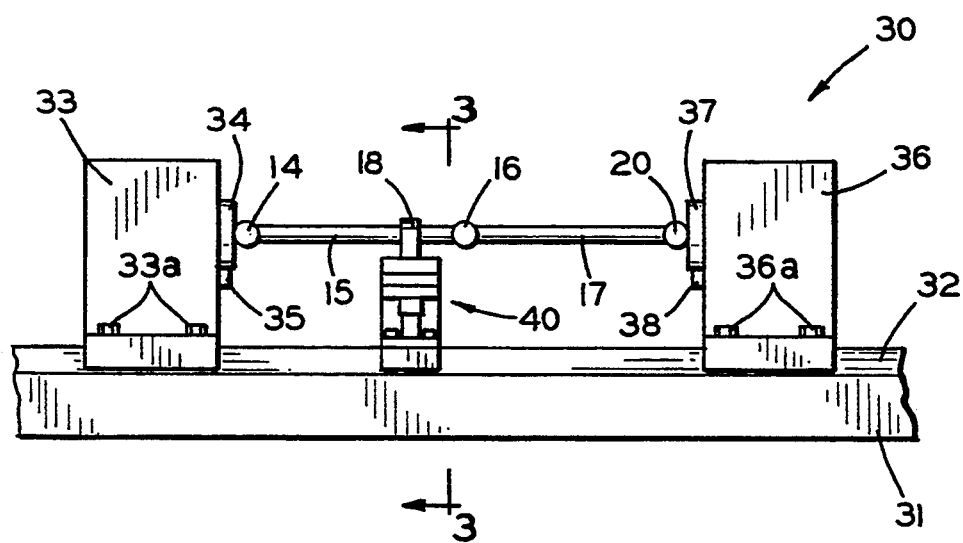
FIG. 2 is a side elevational view schematically illustrating a prior art apparatus for balancing portions of the vehicle drive train system shown in FIG. 1.
Figure 3:
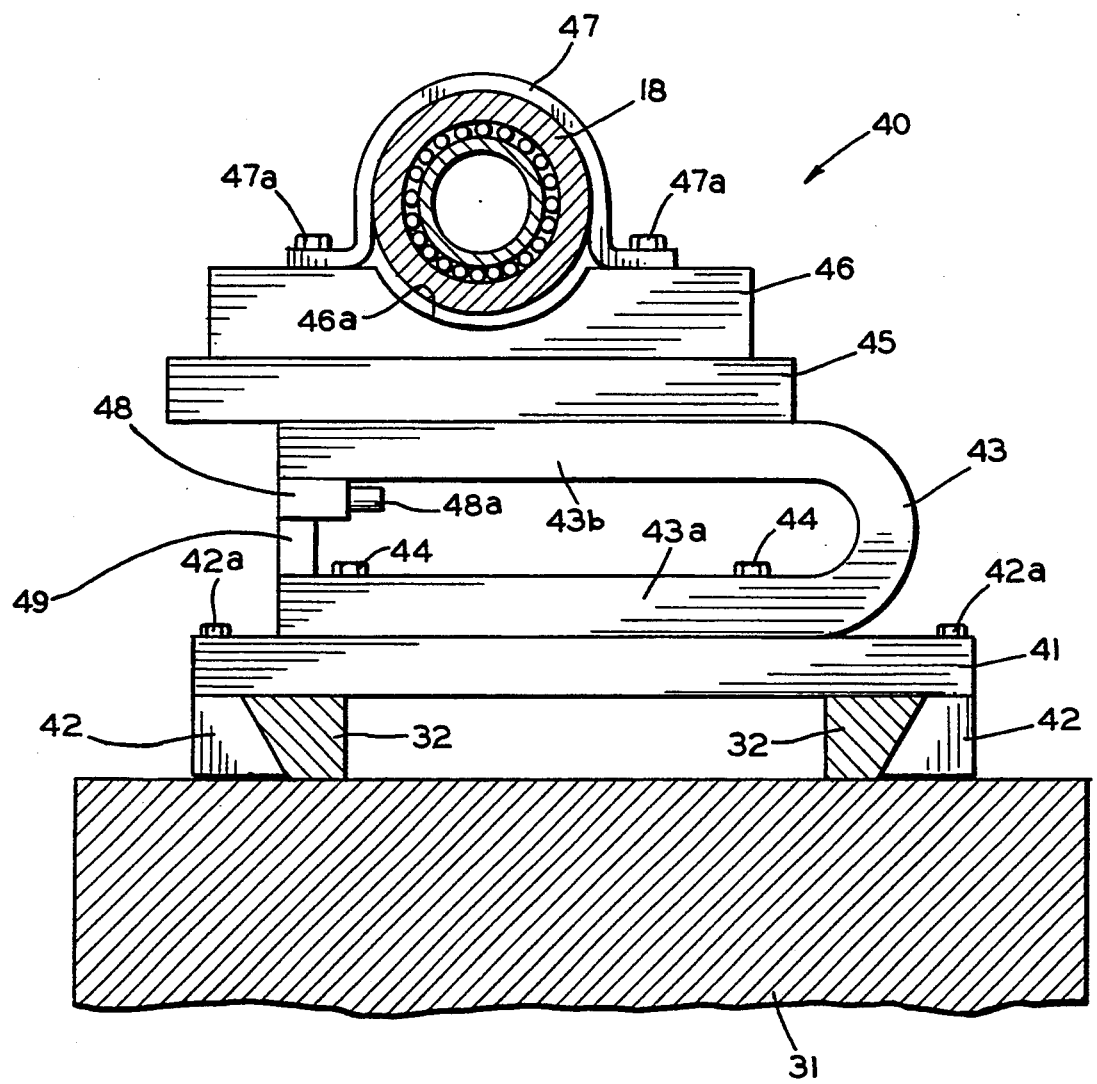
FIG. 3 is an enlarged sectional elevational view taken along line 3—3 of FIG. 2.

Referring now to FIGS. 2 and 3, there is schematically illustrated a prior art apparatus, indicated generally at 30, for balancing the drive shaft. Such balancing is performed prior to installation of the assembly on the vehicle 10. The prior art balancing apparatus 30 includes a base 31 having a pair of elongated tracks 32 secured thereto. A first drive head 33 is mounted on the tracks 32 for sliding movement. Conventional means, such as threaded fasteners 33a, are provided for releasably securing the first drive head 33 in a desired position along the tracks 32 for use.

The first drive head 33 is conventional in the art and includes a variable speed electric motor (not shown). The output shaft of the electric motor is connected to a yoke 34. As shown in FIG. 2, the yoke 34 is adapted to be connected to bearings (not shown) carried on a cross supported on a corresponding yoke portion of the first universal joint 14 mounted on the forward end of the first drive shaft section 15. Thus, it can be seen that the forward end of the first drive shaft section 15 is supported to be rotatably driven by the electric motor in the first drive head 33 when it is energized. The first drive head 33 further includes a vibration sensor 35 mounted thereon. The sensor 35 is conventional in the art and is adapted to generate an electrical signal which is representative of the magnitude of the vibrations induced in the first drive shaft section 15 when rotated.

The prior art balancing apparatus 30 further includes a conventional second drive head 36 including a variable speed electric motor (not shown). The second drive head 36 is also mounted upon the tracks 32 for sliding movement. As with the first drive head 33, conventional means, such as threaded fasteners 36a, are provided for releasably securing the second drive head 36 in a desired position along the tracks 32 for use. Thus, the first drive head 33 and the second drive head 36 can be spaced apart from one another by any desired distance. As will become apparent below, this structure is provided to accommodate varying lengths of the first and second drive shaft sections 15 and 17.

The second drive head 36 supports a yoke 37 for rotational movement. As shown in FIG. 2, the yoke 37 is adapted to be connected to bearings (not shown) carried on a cross supported on a corresponding yoke portion of the third universal joint 20 mounted on the rearward end of the second drive shaft section 17. Thus, it can be seen that the rearward end of the second drive shaft section 17 is supported to be rotatably driven when the electric motor in the second drive head 36 is energized. The second drive head 36 further includes a vibration sensor 38 mounted thereon. The sensor 38 is conventional in the art and is adapted to generate an electrical signal which is representative of the magnitude of the vibrations induced in the second drive shaft section 17 when rotated.

The prior art balancing apparatus 30 further includes a center head, indicated generally at 40, which is disposed between the first drive head 33 and the second drive head 36. The structure of the center head 40 is more clearly illustrated in FIG. 3. As shown therein, the center head 40 includes a base plate 41 having a pair of inverted tracks 42 secured, such as by threaded fasteners 42a, to the lower surface thereof. The base plate 41 and the inverted tracks 42 cooperate with the base 31 and tracks 32 of the balancing apparatus 30 to permit the center head 40 to slide relative thereto. As with the first drive head 33 and the second drive head 36, conventional means (not shown) are provided for releasably securing the center head 40 in a desired position along the tracks 32 for use. Thus, it can be seen that the center head 40 supports the rearward end of the first drive shaft section 15 and the forward end of the second drive shaft section 17 for rotation.

The center head 40 further includes a generally U-shaped bracket 43 having a first leg 43a which is secured, such as by threaded fasteners 44, to the upper surface of the base plate 41. A second leg 43b of the bracket 43 extends above the first leg 43a. A spacer plate 45 is secured, such as by threaded fasteners (not shown) to the upper surface of the upper leg 43b. Similarly, a mounting plate 46 is secured to the upper surface of the spacer plate 45. The mounting plate 46 has an arcuate recess 46a formed therein which is adapted to receive the lower portion of the center bearing assembly 18 with a clearance. An arcuate bracket 47 extends over the upper portion of the center bearing assembly 18 and is secured thereto, such as by welding. The arcuate bracket 47 is secured to the mounting plate 46, such as by threaded fasteners 47a, so as to releasably secure the center bearing assembly 18 to the upper leg 43b of the U-shaped bracket 43.

A vibration sensing unit 48 is mounted on the lower leg 43a by a pedestal 49, adjacent to the open end of the U-shaped bracket 43. The pedestal 49 maintains the vibration sensing unit 48 in abutting contact with the upper leg 43b of the bracket 43. A vibration sensor 48a is mounted on the vibration sensing unit 48. The sensor 48a is conventional in the art and is adapted to generate an electrical signal which is representative of the magnitude of the vibrations induced in the center bearing assembly 18 (and transmitted through the mounting plate 46 and the spacer plate 45) when the first and second drive shaft sections 15 and 17 are rotated by the first and second drive heads 33 and 36.

As is well known, if the drive shaft is unbalanced for such rotation, portions of it will become radially displaced when rotated. These radial displacements are sensed by the sensors 35, 38, and 48a as vibrations, and corresponding electrical signals are generated in response thereto. The signals from the sensors 37 may be fed to a conventional microprocessor (not shown). The microprocessor is responsive to the sensor signals for automatically calculating and displaying a recommended size and position for one or more balance weights to be secured to the drive shaft sections 15 and 17 to reduce the unbalance.

In operation, the first drive head 33, the second drive head 36, and the center head 40 are initially positioned along the tracks 32 so as to accommodate the lengths of the first and second drive shaft sections 15 and 17. Then, the universal joint 14 carried on the forward end of the first drive shaft section 15 is connected to the yoke 34 of the first drive head 33, while the universal joint 20 carried on the rearward end of the second drive shaft section 17 is connected to the yoke 37 of the second drive head 36. Similarly, the center bearing assembly 18 is connected to the center head 40 by means of the bracket 47.

Then, the electric motors in the first and second drive heads 33 and 36 are energized so as to rotate the drive shaft, typically to a rotational speed which is approximately equal to its normal operating speed (i.e., about three thousand revolutions per minute). The sensors 35, 38, and 48a generate electrical signals to the microprocessor which are representative of vibrations generated when the unbalanced drive shaft is rotated. As discussed above, the microprocessor is responsive to these sensor signals for automatically calculating and displaying a recommended size and position for one or more balance weights to be secured to the drive shaft sections 15 and 17 to reduce the unbalance.

Figure 4:
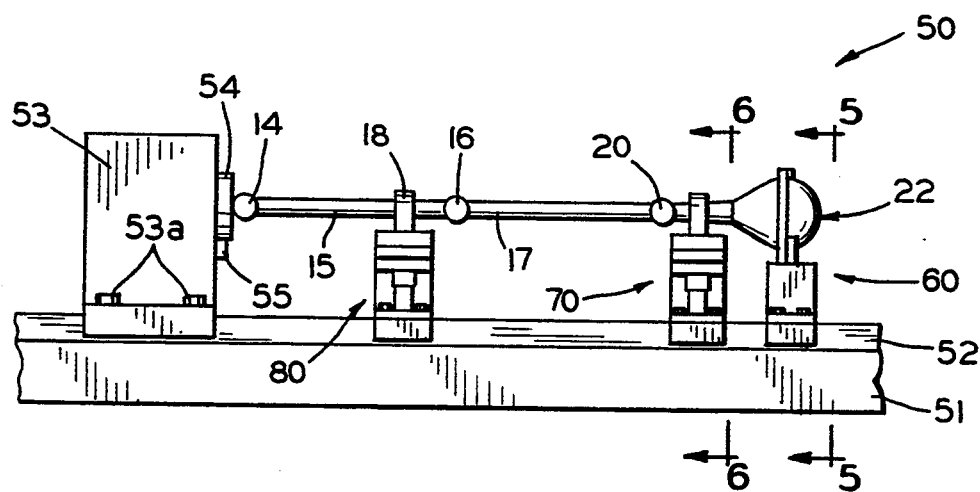
FIG. 4 is a side elevational view schematically illustrating an improved apparatus for balancing portions of the vehicle drive train system shown in FIG. 1 in accordance with this invention.
Figure 5:
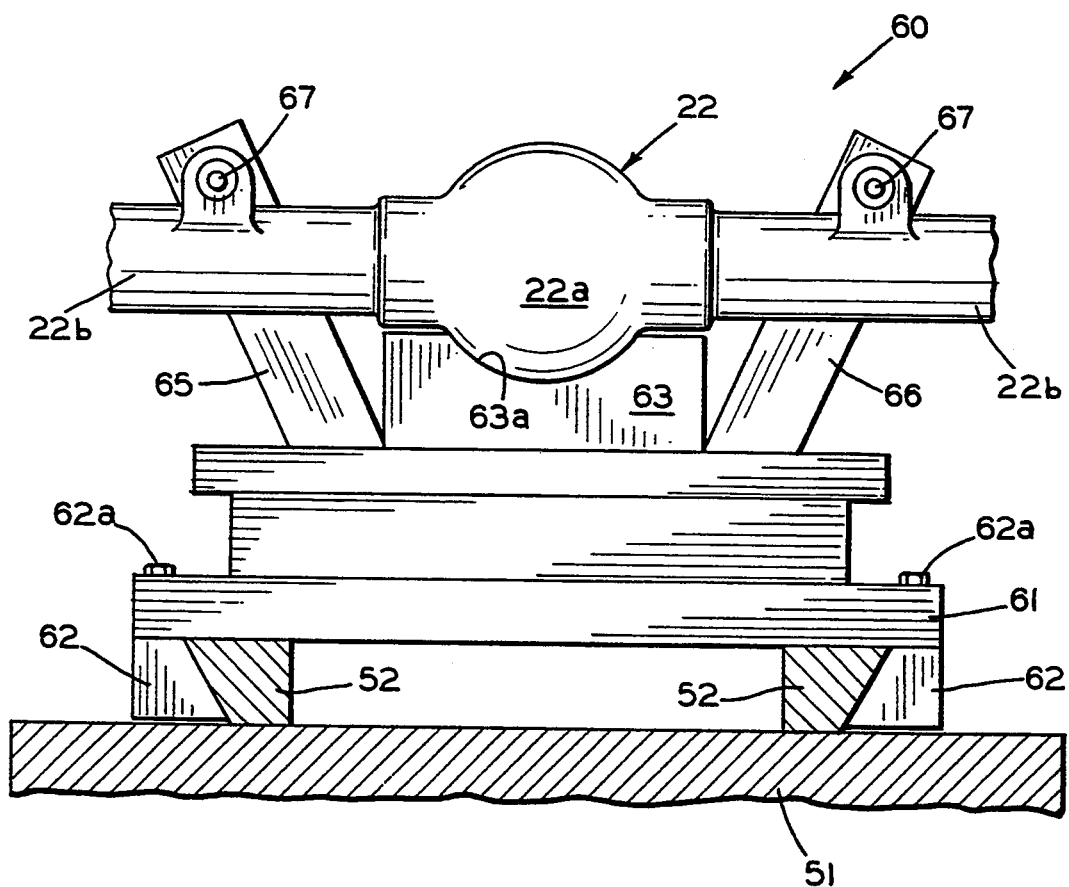
FIG. 5 is an end elevational view taken along line 5—5 of FIG. 4 showing the support head and axle of the balancing apparatus.

Referring now to FIGS. 4 and 5, there is schematically illustrated an improved apparatus, indicated generally at 50, for balancing the combined assembly of the first universal joint 14, the first drive shaft section 15, the second universal joint 16, the second drive shaft section 17, the third universal joint 20 and the input shaft of the axle 22. As with the prior art balancing apparatus 30, the improved balancing apparatus 50 includes a base 51 having a pair of elongated tracks 52 secured thereto. A drive head 53 is mounted on the tracks 52 for sliding movement. Conventional means, such as threaded fasteners 53a, are provided for releasably securing the drive head 53 in a desired position along the tracks 52 for use.

The drive head 53 includes a variable speed electric motor (not shown). The output shaft of the electric motor is connected to a yoke 54. As shown in FIG. 4, the yoke 54 is adapted to be connected to bearings (not shown) carried on a cross supported on a corresponding yoke portion of the first universal joint 14 mounted on the forward end of the first drive shaft section 15. Thus, it can be seen that the forward end of the first drive shaft section 15 is supported to be rotatably driven by the electric motor in the drive head 53 when it is energized. The drive head 53 further includes a vibration sensor 55 mounted thereon. The sensor 55 is conventional in the art and is adapted to generate an electrical signal which is representative of the magnitude of the vibrations induced in the first drive shaft section 15 when rotated by the drive head 53.

The balancing apparatus 50 further includes a support head, indicated generally at 60. The structure of the support head 60 is more clearly illustrated in FIG. 5. As shown therein, the support head 60 includes a base plate 61 having a pair of inverted tracks 62 secured, such as by threaded fasteners 62a, to the lower surface thereof. The base plate 61 and the inverted tracks 62 cooperate with the base 51 and tracks 52 of the balancing apparatus 50 to permit the support head 60 to slide relative thereto. As with the drive head 53, conventional means (not shown) are provided for releasably securing the support head 60 in a desired position along the tracks 52 for use. Thus, the drive head 53 and the support head 60 can be spaced apart from one another by any desired distance. As will become apparent below, this structure is provided to accommodate drive shaft sections and axle input shafts of varying length.

A cradle plate 63 is connected, such as by welding, to the upper surface of the base plate 61. The cradle plate 63 has an arcuate recess 63a formed in the upper surface thereof which is adapted to receive and support the lower surface of central housing portion 22a of the axle 22. First and second support arms 65 and 66 are also connected, such as by welding, to the upper surface of the base plate 61. The support arms 65 and 66 extend upwardly and outwardly from the base plate 61 and are adapted to be secured, such as by bolts 67, to outwardly extending housing portions 22b of the axle 22. Thus, the central housing portion 22a and the outwardly extending housing portions 22b of the axle 22 are secured supported on and secured to the support head 60 so as to prevent any significant movement thereof when the balancing apparatus 50 is operated.

The balancing apparatus 50 further includes a first intermediate head, indicated generally at 70, which is disposed between the drive head 53 and the support head 60 adjacent to the axle 22. The structure of the first intermediate head 70 is more clearly illustrated in FIG. 6. As shown therein, the first intermediate head 70 includes a base plate 71 having a pair of inverted tracks 72 secured, such as by threaded fasteners 72a, to the lower surface thereof. The base plate 71 and the inverted tracks 72 cooperate with the base 51 and tracks 52 of the balancing apparatus 50 to permit the first intermediate head 70 to slide relative thereto. As with the drive head 53 and the support head 60, conventional means (not shown) are provided for releasably securing the first intermediate head 70 in a desired position along the tracks 52 for use.

The first intermediate head 70 further includes a generally U-shaped bracket 73 having a first leg 73a which is secured, such as by threaded fasteners 74, to the upper surface of the base plate 71. A second leg 73b of the bracket 73 extends above the first leg 73a. A spacer plate 75 is secured, such as by threaded fasteners (not shown) to the upper surface of the upper leg 73b. Similarly, a mounting plate 76 is secured to the upper surface of the spacer plate 75. The mounting plate 76 has an arcuate recess 76a formed therein which is adapted to receive a forward housing portion 22c of the axle 22 with a clearance. An arcuate bracket 77 extends over the upper portion of the forward housing portion 22a of the axle 22 and is secured thereto, such as by welding. The arcuate bracket 77 is secured to the mounting plate 76, such as by threaded fasteners 77a, so as to releasably secure the forward housing portion 22a of the axle 22 to the upper leg 73b of the U-shaped bracket 73.

A vibration sensing unit 78 is mounted on the lower leg 73a by a pedestal 79, adjacent to the open end of the U-shaped bracket 73. The pedestal 79 maintains the vibration sensing unit 78 in abutting contact with the upper leg 73b of the bracket 73. A vibration sensor 78a is mounted on the vibration sensing unit 78. The sensor 78a is conventional in the art and is adapted to generate an electrical signal which is representative of the magnitude of the vibrations induced in the forward end 22a of the axle 22 (and transmitted through the mounting plate 76 and the spacer plate 75) when the axle input shaft 21 therein is rotated by the drive head 53.

The balancing apparatus 50 further includes a second intermediate head, indicated generally at 80. The structure of the second intermediate head 80 is identical to the structure of the prior art center head 40 discussed above. As with the center head 40, the second intermediate head 80 is adapted to receive and support the lower portion of the center bearing assembly 18. The second intermediate head 80 has a conventional vibration sensor mounted thereon which is adapted to generate an electrical signal representative of the magnitude of the vibrations induced in the first drive shaft section 15 when rotated by the drive head 53.

In operation, the drive head 53, the support head 60, the first intermediate head 70, and the second intermediate head 80 are initially positioned along the tracks 52 so as to accommodate the lengths of the first and second drive shaft sections 15 and 17 and the length of the axle input shaft 21. Then, the drive train components are mounted on the balancing apparatus 50. To accomplish this, the first universal joint 14 carried on the forward end of the first drive shaft section 15 is connected to the yoke 54 of the drive head 53, while the central housing portion 22a and the outwardly extending housing portions 22b of the axle 22 are supported on and secured to the support head 60. Similarly, the center bearing assembly 18 is secured to the second intermediate head 80, while the forward housing portion 22a of the axle 22 is secured to the first intermediate head.

Then, the electric motor in the drive head 53 is energized so as to rotate the entire drive shaft assembly, typically to a rotational speed which is approximately equal to its normal operating speed. The sensors 55, 58, and 78a generate electrical signals to the microprocessor which are representative of vibrations generated when the unbalanced combined drive shaft and axle input shaft assembly is rotated. As discussed above, the microprocessor is responsive to these sensor signals for automatically calculating and displaying a recommended size and position for one or more balance weights to be secured to the drive shaft sections 15 and 17 to reduce the unbalance.

Unlike the prior art balancing apparatus 30 discussed above, the balancing apparatus 50 of this invention dynamically balances the combined drive shaft and axle input shaft assembly. By balancing the components of the drive train system in this manner, improved operation of the vehicle results. This is because the balanced assembly avoids the potential unbalance situation discussed above which can occur as a result of the summation of the smaller individual unbalances of the prior art drive shaft and the axle input shaft when connected together. Consequently, vibrations in the vehicle 10 are significantly reduced.

In accordance with the provisions of the patent statues, the principle and mode of operation of this invention have been described and illustrated in its preferred embodiment. However, it will be understood that this invention may be practiced otherwise than as specifically explained and illustrated without departing from the spirit and scope of the following claims.

What is claimed is:

1. An apparatus for rotatably balancing a combined assembly of a drive shaft for a vehicle connected to an input shaft mounted in a vehicle axle, said apparatus comprising:
    means for rotatably supporting the drive shaft;
    means for supporting the axle;
    means for rotating the combined assembly of the drive shaft and the input shaft;
    means for measuring vibrations generated by the drive shaft and input shaft as they are rotated and for generating signals in response thereto; and
    means responsive to said vibration signals for calculating and displaying a recommended size and position for a balance weight to be secured to the drive shaft to rotatably balance the combined assembly.

2. The balancing apparatus defined in claim 1 wherein said means for rotatably supporting the drive shaft includes a drive head connected to an end of the drive shaft.

3. The balancing apparatus defined in claim 2 wherein said drive head includes said means for rotating the combined assembly of the drive shaft and the input shaft.

4. The balancing apparatus defined in claim 3 wherein said means for measuring vibrations includes a sensor mounted on said drive head for generating said signals.

5. The balancing apparatus defined in claim 1 wherein said means for supporting the axle includes a support head having a cradle for receiving and supporting a portion of the axle.

6. The balancing apparatus defined in claim 5 wherein said means for supporting the axle further includes support arms means for engaging and supporting the axle.

7. The balancing apparatus defined in claim 6 wherein said support arm means includes a pair of support arms adapted to be secured to the axle.

8. The balancing apparatus defined in claim 1 further including means for supporting a portion of said axle which is disposed about the input shaft.

9. The balancing apparatus defined in claim 8 wherein said means for measuring vibrations includes a sensor mounted on said portion of said axle which is disposed about the input shaft for generating said signals.

10. The balancing apparatus defined in claim 1 further including means for supporting an intermediate portion of said drive shaft.

11. The balancing apparatus defined in claim 10 wherein said means for measuring vibrations includes a sensor mounted on said intermediate portion of said drive shaft for generating said signals.

* * * * *